Figure 1:
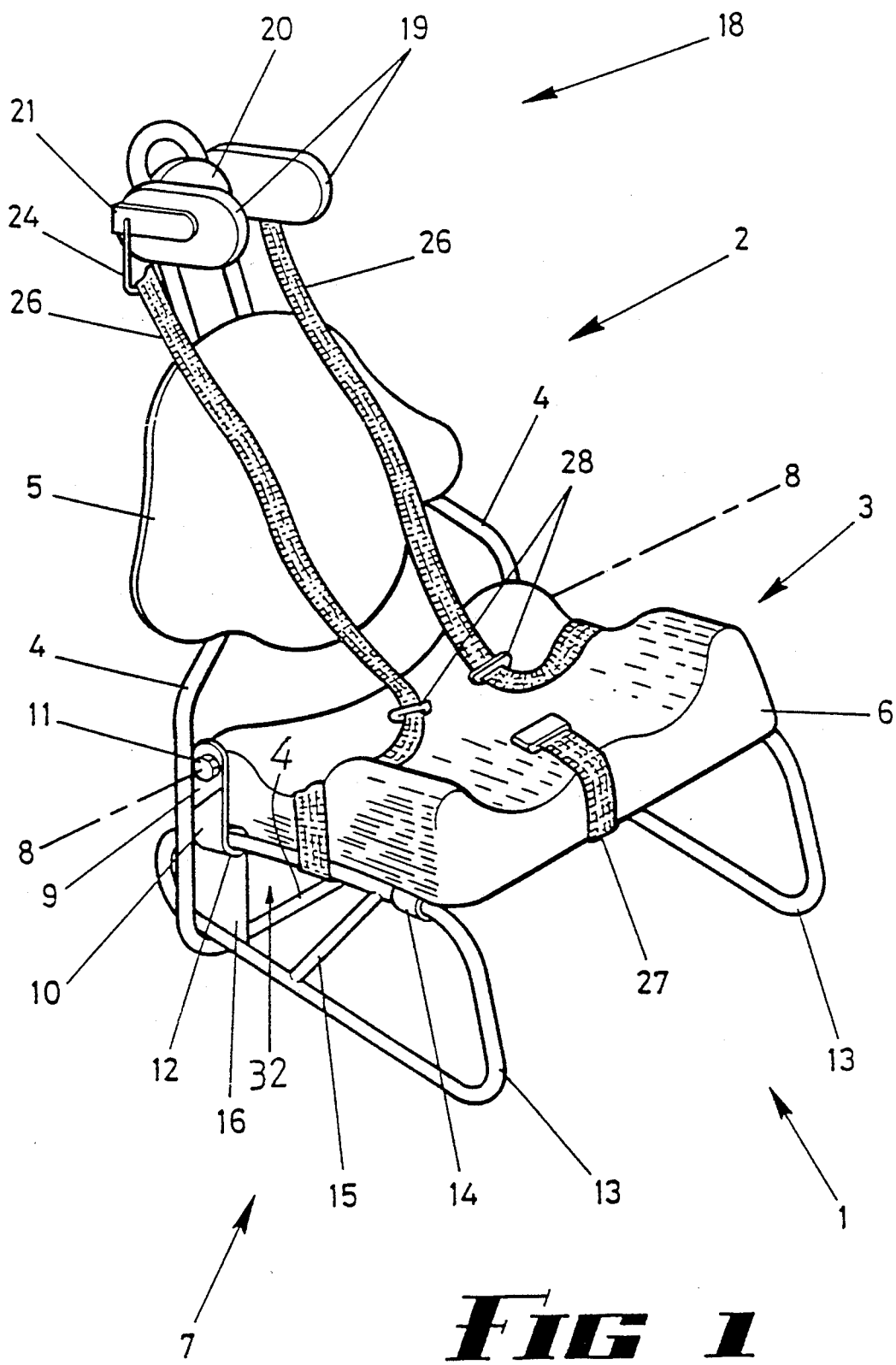

United States Patent [19]

Gillies et al.

[11] Patent Number: 5,054,853
[45] Date of Patent: Oct. 8, 1991

[54] INFANT SAFETY CHAIRS

[75] Inventors: John D. Gillies, 58a Lake Crescent, Hamilton, New Zealand; Robin S. Bisley, Hamilton, New Zealand

[73] Assignee: John D. Gillies, Hamilton, New Zealand

[21] Appl. No.: 407,548

[22] Filed: Sep. 15, 1989

[51] Int. Cl.⁵ .................................................. A47C 1/08
[52] U.S. Cl. ..................................... 297/250; 297/216
[58] Field of Search ............... 297/250, 216, 378, 379, 297/460, 410, 17, 53, 54

[56] References Cited

U.S. PATENT DOCUMENTS

| 2,308,315 | 1/1943 | Smith | 297/250 |
|---|---|---|---|
| 2,496,205 | 1/1950 | Grieb | 297/250 X |
| 2,740,407 | 4/1956 | Page | 297/410 X |
| 3,265,437 | 8/1966 | Mincieli | 297/378 |
| 3,762,768 | 10/1973 | Hyde et al. | 297/255 X |
| 4,376,551 | 3/1983 | Cone | 297/250 |
| 4,482,184 | 11/1984 | Mincey | 297/378 X |
| 4,676,555 | 6/1987 | Tokugawa | 297/216 X |

Primary Examiner—José V. Chen
Attorney, Agent, or Firm—Abelman Frayne Rezac & Schwab

[57] ABSTRACT

Described herein is a infant safety chair which is adapted to be secured to an adult seat in a vehicle while in turn the infant is secured to the safety chair by a suitable harness. The three major elements of the chair being he base, chair back and chair support are all extensibly attached so that the chair can be collapsed into a very compact unit for storage.

5 Claims, 4 Drawing Sheets

INFANT SAFETY CHAIRS

This invention relates to infant safety chairs.

Because infant safety chairs are not always constantly in use it is desirable that they be folded into a compact form for storage. This is particularly desirable in situations where storage space is at a premium, for example, on passenger aeroplanes.

U.S. Pat. NO. 3,762,768(Hyde et.al) describes an infant car seat which is designed to be folded into a compact form for storage and which can be secured to an adult seat utilising a seat belt. This seat however is not particularly compact in a folded down position mainly because it incorporates a relatively bulky armrest somewhat similar to that used on some infant highchairs.

Another important disadvantage of the seat described by U.S. Pat. NO. 3,762,768 is that the sub-frame which supports the seat is collapsable by pivotable movement of the supporting sub-frame in a forward or rearward direction. This is not desirable in an accident situation where the impact on the vehicle is very likely to be in the forward or rearward directions.

It is an object of the present invention to provide an infant safety chair which can be readily folded into a compact form for storage and can be secured on an adult seat by the use of a seat belt.

Further objects and advantages of the present invention will become apparent from the ensuing description which is given by way of example.

The present invention provides an infant chair which is readily folded into a compact form for storage and in use mounted on an adult seat in a vehicle the chair comprising:

- a seat assembly which provides posterior support for the occupant,
- a back assembly extensibly attached to the seat assembly which provides back and head support for the occupant,
- a base support attached to the underside of the seat assembly and arranged in use to support the seat in an elevated position on an adult seat of a vehicle and be secured in that position by the adult seat belt,
- a harness for securing the infant in position in the erected seat,
- the arrangement being such that the chair is readily collapsed for storage when the base support and back assembly are folded relative to the seat assembly. It is envisaged that the present invention could have a wider range of applications. For instance, when used in the domestic sector, one possible embodiment could be readily removed from a vehicle and stood in the upright position on the ground,, serving as a temporary chair for infants during picnics. An attachable additional base assembly could be used to elevate the chair, converting the safety chair into a portable infant's high chair.

The seat assembly comprises a posterior support and a base assembly. As the posterior support is the section on which the infant sits, it is preferably formed of a yielding resilient material able to accommodate the contours of a child's posterior. One embodiment of this is a foam or cellular padding co-extensive with a rigid support and sheathed by an outer covering, the outer covering preferentially of a water impermeable material that is easily cleaned. In addition the rigid support or the padding material could be further shaped or moulded to accommodate the posterior of a child. One embodiment especially amenable in this regard would be a singular moulded posterior support of a plastics material such as urethane or p.v.c.(poly-vinyl-chloride).

The posterior support, as previously described, is mounted on a base. This could be formed as an integrated unit with a one piece rigid base non-moveably affixed to the posterior support. This could also be formed as a one piece unit, thereby lending itself to modern moulding techniques although attention to design is necessary lest it suffers the disadvantage of being too bulky when the chair is in a folded position (which may occur if the height of the base is excessive).

Is is generally of more practical advantage to provide a collapsible base. One such embodiment comprises two spaced apart base supports. These are pivotably connected to the posterior support allowing them to be folded inwardly underneath or outwardly and up the sides thereof. Other means of providing a collapsible base are possible including providing a greater or lesser amount of supports or elements of which all or some may be pivotably or moveably connected to other components of the infant chair. It is also possible to design the chair so that the back assembly extends below the posterior support and contributes to the base. The large amount of variations of mechanisms for a seat assembly precludes mentioning all the possible permutations through the reader should be aware that it is desirable to have a seat assembly that co-operates with the folding of the chair and that many means of carrying this into effect by moveable connections exist.

The materials from which the base is fabricated are limited only by the existing technology. One embodiment comprises base supports of tube stock of a light metal such as aluminium whilst it would be equally advantageous to form the elements of a base from a high strength of reinforced plastics. Many lightweight alloys and composites possessing suitable characteristics exist and could equally as well be utilised for constructions.

In a preferred embodiment the back assembly consists of a frame and a back support. The back support, literally, provides support for the back and lumbar regions of the occupant. Again for comfort, this should be formed of a resilient compressible material similar to that used for the posterior support. The frame is connected to the seat assembly and should be rigid enough to hold the back support to which it is also attached. Preferably the frame is pivotably or moveably connected to the seat assembly, allowing the back assembly to fold forward over the posterior support while in other embodiments the frame may be formed of two or more elements hinged or moveable in relation to each other, allowing the said frame to be compactly arranged or stowing away.

Just as the seat assembly could be integrated, so the frame and back support could be incorporated in a single operating unit. Again a reinforced plastics would be a desirable choice though other possibilities have been previously mentioned. It is possible to have a back assembly where the back support extends wider than the posterior support and the side edges curve forward. This would provide additional side support to an occupant of the chair. In making the back support wider than the posterior support, the arrangement would allow the forwardly extending portions of the back support to extend past the folded base and posterior support in a folded chair. This would add a degree of protection to the aforementioned base and posterior support and would make it easier to stack several of the folded chairs together.

Other possible embodiments of the chair include arm supports for the occupant of the seat. These, by necessity, would have to co-operate with the folding of the seat and are therefore designed to be mounted on the back or seat assembly in such a manner that they may be folded into a suitable position prior to folding of the chair they are not already adapted to be incorporated within the folded assembly.

A locking mechanism is necessary to maintain the back in the desired position relative to the seat assembly. In the simplest form this may be provided by means of a stop interacting with the back assembly. A more sophisticated arrangement would allow the back assembly to be positioned in a number of inclinations relative to the seat assembly and could possibly be achieved through the use of an adjustable stop, a ratchet mechanism or any practicable mechanical means.

The infant chair is further adapted to be positioned on an adult seat in a vehicle.

One embodiment allow the invention to be positioned in a forward or rearward facing direction. The ideal securing means is by using existing safety or harness belts on the adult seat and a preferred embodiment of the invention has apertures in the base to allow such a safety or harness belt to pass through. In another example the seat and back assemblies have been modified to accommodate an existing lap and shoulder safety belt. Other methods of securing the invention to an adult seat are possible. For instance, the infant chair could be adapted to accommodate a harness which passes around the rear of the adult seat and which is subsequently tightened to a desired degree. This embodiment would be more practical for adult bucket seats where there is generally unrestricted access to the rear thereof.

Once the infant safety chair has been secured to an adult seat or other suitable mounting position, it is desirable to have a secondary means of securing the infant into the seat. A variety of harness systems may be incorporated into the seat, including a five point, three point or two point attachment system. The harnesses or safety belts are preferably attached to a sufficiently strong part of the chair such as the posterior support and the frame of the back assembly. Alternatively the chair could be provided without an inbuilt harness system, instead having mounting points suitable for the inclusion of a separate harness system.

For younger children and infants it is also desirable to have a form of head support. This may be provided by a mountable auxiliary head support which has been adapted to be engaged with the back assembly. It is also desirable that the head support is adjustable to several positions as it is foreseeable that infants of varying sizes will be occupants of the chair. Where a tubular frame is used for the back assembly, a simple adjusting and fastening mechanism would include two plates positioned fore and aft of the frame with a tightening bolt connecting the two plates, such that tightening the bolt draws the two plates into closer contact with each other thereby increasing the pressure within. The corresponding increase of friction with respect to a tubular frame maintains the head support in position. Adjusting the head support is therefore a simple matter of loosening the bolt, sliding the head support up and down the tubular frame and tightening the bolt once the desired position is located. On other types of frames alternative mounting mechanisms may be necessary. For instance a nut and bolt fastening system could be used in conjunction with accommodating apertures within the back assembly. It is also desirable to mount the head support on the strongest part of the back assembly - generally the frame. If this precept is followed it is possible to use the head support as a mounting position for the infant harness assembly.

It is also a desirable feature of a head support to provide support to the occupants head in at least three positions. Ideally this is achieved by provision of lateral (sideways) support to either side of the head (two positions) as well as rear of the head support. This may be accomplished by having movable elements extending forward that may be adjusted to several positions. Alternatively a one piece contoured head rest could incorporated into the support though other possible embodiments exist such as a support that curves over the head and provides front support to the forehead of the occupant.

Current aircraft regulations require seats within aircraft to have backs that collapse forwardly once a predetermined loading has been reached. Incorporation of a mechanism, into the chair to detemine the loading at which the back assembly will collapse forwardly may be simply provided by means of a shear link though other means are possible. The link or means should be arranged so that it may be partially disconnected from the chair so as not to interfere with the folding of the chair. Incorporation of such a feature would allow the device to comply with relevant aspects of current air regulations governing equipment used within aircraft.

Figure 2:
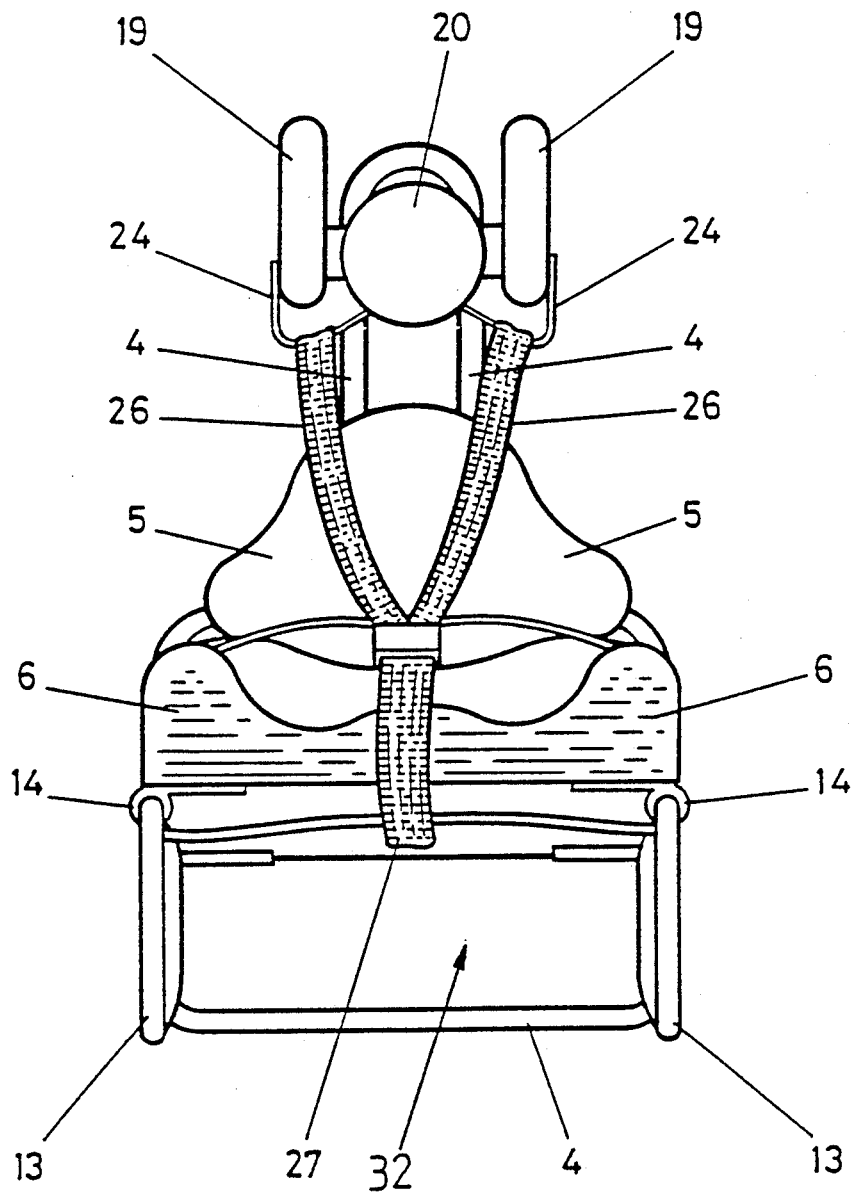
Figure 3:
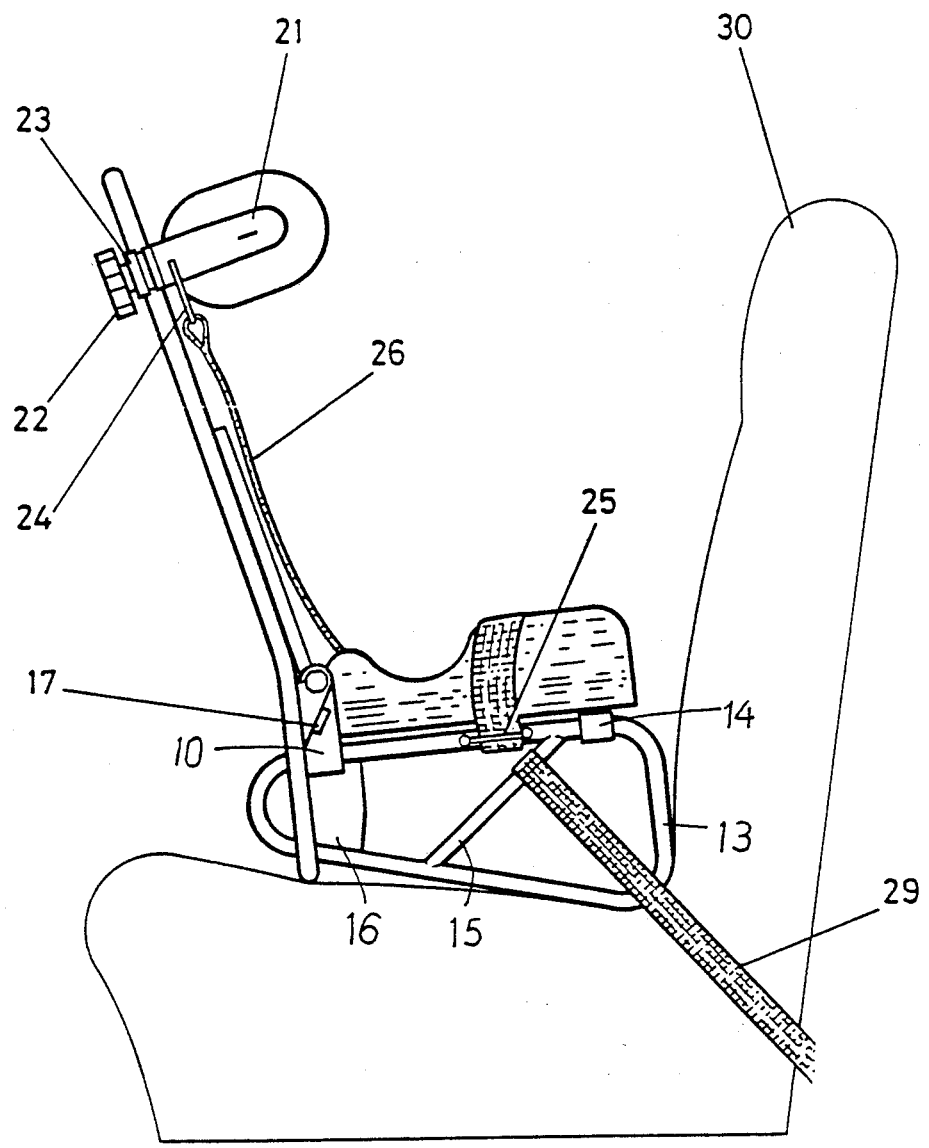
Figure 4:
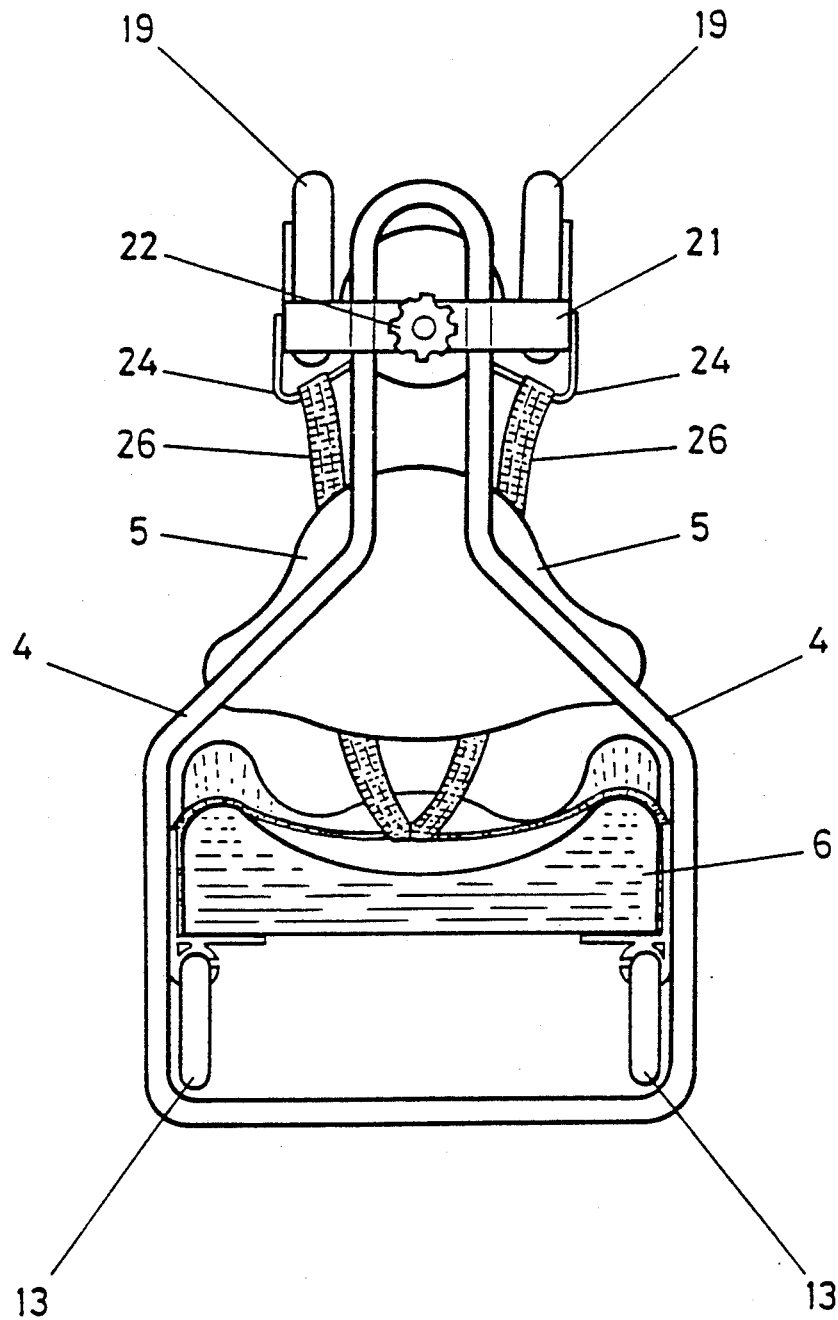

Aspects of the present invention will be described by way of example only with reference to the accompanying drawings in which:

FIG. 1: is a perspective view of an infant safety chair in accordance with a preferred embodiment of the present invention, FIG. 2: is a diagrammatic from view of the infant safety chair shown in FIG. 1, FIG. 3: is a diagrammatic side view of the infant safety chair shown in FIG. 1 mounted on an adult seat, and FIG. 4: is a diagrammatic rear view of the infant safety chair as shown in FIG. 1.

With reference to the drawings and by way of example, the infant safety chair, generally indicated by arrow 1, comprises a back assembly, generally indicated by arrow 2, and a seat assembly, generally indicated by arrow 3, the said back assembly including a frame 4 and a back support 5 and which is extensibly attached to the seat assembly 3 which in turn includes a posterior support 6 mounted on a vase, generally indicated by arrow 7; said chair being adapted to receive or including a safety restraint or harness assembly 27, 28 for the occupant of the chair and the construction of the chair being such that it can be folded for storage.

The back assembly comprises a frame 4 which is fabricated from a single piece of aluminium light weight alloy tubing and is pivotably mounted to the seat assembly about a pivot axis 8. Two protruding tabs 9 are complementary to two separate pivot supports 10 affixed to the seat assembly 3. Bolts 11 pass through apertures in the tabs 9 and supports 10 and are secured by nuts in order to secure the back assembly 2. The back support 5 is a one piece plastics moulding directly fastened to the frame 4.

The end of the pivot support 10 distal from the protruding tab 9 is affixed to a sleeve 12 through which extends base support.

The base comprises two such base supports 13 which are pivotably mounted to the posterior support 6 by means of the previously mentioned sleeve 12 and additional sleeves 14 directly affixed to the bottom of the posterior support. The base support extends through both of these sleeves which have an internal diameter marginally greater than the tubing from which the base support 13 is formed, thereby allowing the base support to swivel within. A diagonal bracing member 15 and a plate 16 provide additional strength for the individual base supports 13, although other methods such as eccentric rings (not shown) for positively locating the supports 13 in a vertical position may be used.

The posterior support is a semi-rigid one piece plastics moulding which is contoured to accommodate an occupant's posterior.

As aforementioned the back assembly is forwardly pivotable with respect to the seat assembly by means of a lock nuts and bolts 11 passing along the pivotal axis 8 and which extends the entire width of the seat assembly, in effect connecting the two protruding tabs 9. A stop 17 formed by a boss or knob protruding outwardly from pivot support 10 effectively defines the angle of inclination for the back assembly as further rearward movement is prevented when a protruding tab 9 comes to rest against a stop 17.

It should be noted that in the erected position the rearward ends of the supports 13 are located within the confines of the base frame 4 at a lowermost portion thereof.

A head support is provided as generally indicated by arrow 18. The head support is comprised of two padded side elements 19 and a rear element 20 connected by a metal bar 21 extending forwardly at the distal ends (giving a U-shaped plan section) and affixed to the outer surfaces of the padded elements 19 and 20. The padded elements consist of a rigid backing with a padded covering on the sides against which the occupant's head will come to rest. The plate 21 has an aperture near its middle of which the bore is threaded and complementary to a threaded adjuster bolt 22. The head of the adjuster bolt is enlarged and fluted to provide an improved gripping surface.

In use the adjuster bolt first passes through an aperture in an ancillary plate 23 (aligned with the aperture in plate 21), in which it may freely revolve, before it passes into the threaded aperture of the plate 21. The arrangement is such that tightening the adjuster bolt 22 draws plates 21 and 23 closer together, said plates being disposed fore and aft of the frame 4 and providing a successively increasing grip upon tightening the adjuster bolt 22.

Upper mounting links 24 are provided by a suitably shaped piece of rod firmly affixed to the head support 18. Lower mounting links 25 are provided by a piece of rod deformed to a U-shaped plan section firmly affixed to the base support 13. The harness system is provided by pieces of webbing 26 directly attached to upper 24 and lower 25 mounting links which are used in conjunction with a central buckle and webbing piece 27 which is directly attached to the posterior support 6. The buckle of the central webbing piece 27 interacts with the complementary connector links 28 to secure an infant occupant in position.

In use, all that is required to secure the safety chair to an adult seat (as illustrated in FIG. 3) is for a lap belt 29 to be passed through the base support 13, for it to be conected and then tightened. A similar method would be used to secure the seat in a forward facing direction. It is proposed that the safety chair can be used for infants weighing between 5 and 12 kilograms when in a rear facing direction whereas larger infants weighing between 12 and 25 kilograms would require a forward facing direction.

To fold the seat for storage the lap belt 29 is disengaged, the base supports 13 pivotable on a longitudinal axis are folded inwardly, with respect to the posterior support 6, and the back assembly folded forwardly with respect to the posterior support. The folded unit may then be stacked or stored until needed. Assembly is simply a reversal of folding. The back assembly is lifted into the upright position followed by folding the base supports outwardly into a substantially vertical position. The head support may be adjusted by loosening the adjuster bolt 22 and sliding the entire head support unit 18 along the frame 4 until the desired position is achieved. The adjuster bolt 22 is then tightened and the chair positioned on an adult seat 30 and secured by means of a lap belt 29.

We claim:

1. An infant safety chair comprising a seat assembly, a back assembly, and a support for said seat assembly, in which:
    said back assembly is pivotally connected to said seat assembly at a position spaced upwardly from a lowermost portion of said back assembly when said chair is in use, said pivotal connection having an axis of pivoting extending in the same general direction as a rear edge of said seat assembly; and,
    said support for said seat assembly being comprised of support members, and hinged connections between said seat assembly and those portions of said support members that are uppermost when said chair is in use, said hinged connections each having an axis of hinging extending longitudinally of an associated side edge of said seat assembly;
    rear portions of said support members extending within and beyond the confines of said lowermost portion of said seat back when said chair is in an erected position for use;
    whereby, said lowermost portion of said seat back assembly prevents outward splaying movement of said support members in the erected condition of said chair, and provides reaction members for said support members preventing said outward splaying under the influence of straps attached to said support members and which are employed to secure said infant chair to a vehicle seat.

2. An infant chair as claimed in claim 1 wherein the back assembly is constructed from a tubular frame which supports a contoured back support and provides a rail for a vertically adjustable head support.

3. An infant safety chair as claimed in claim 2 including a head support vertically adjustable within the rail said head support providing support for the back and sides of the user's head.

4. An infant chair as claimed in claim 1 incorporating a locking mechanism which locks the back assembly in a selected inclination with respect to the seat assembly.

5. An infant chair as claimed in claim 1 wherein the back assembly is forwardly collapsible by forward hinging movement about said pivotal connections.

* * * * *